United States Patent [19]

Tobe

[11] Patent Number: 4,554,602
[45] Date of Patent: Nov. 19, 1985

[54] VIDEO SIGNAL RECORDING APPARATUS

[75] Inventor: Kazumitsu Tobe, Kanagawa, Japan

[73] Assignee: Canon Kabushiki Kaisha, Tokyo, Japan

[21] Appl. No.: 467,349

[22] Filed: Feb. 17, 1983

[30] Foreign Application Priority Data

Mar. 3, 1982 [JP] Japan .................................. 57-33289

[51] Int. Cl.[4] .......................... H04N 5/78; G11B 27/00
[52] U.S. Cl. .................................... 360/14.2; 360/13; 358/337; 358/338
[58] Field of Search ....................... 360/13, 14.1, 14.2, 360/18, 69; 358/335, 337, 338

[56] References Cited

U.S. PATENT DOCUMENTS 4,358,797 11/1982 Nishijima et al. .................. 360/14.2

Primary Examiner—Robert L. Richardson
Attorney, Agent, or Firm—Toren, McGeady, Stanger, Goldberg & Kiel

[57] ABSTRACT

A video signal recording apparatus includes apparatus for driving a recording medium; video signal recording apparatus for recording a video signal on the medium; control signal reproducing apparatus for reproducing a control signal recorded on the medium; and signal producing apparatus for producing a first signal which relates to the driven state of the medium. Also included are first control apparatus for controlling the drive apparatus according to a phase difference between the control signal reproduced by the control signal reproducing apparatus and a second signal which relates to a video signal to be recorded on the medium. A second control apparatus controls the signal producing apparatus with the second signal during a period close to a time at which at least the drive apparatus reaches a prescribed stable condition.

12 Claims, 8 Drawing Figures

VIDEO SIGNAL RECORDING APPARATUS

BACKGROUND OF THE INVENTION

1. Field of the Invention:

This invention relates to a video signal recording apparatus and more particularly to a video signal recording apparatus of the type in which, at the time of recording a video signal, a control signal is recorded simultaneously on a recording medium with the video signal.

2. Description of the Prior Art:

Recently, there has been an increase in video signal recording apparatus of the type having a connected or splice recording function which, in resuming a video signal recording operation after a temporary cessation of the recording operation on a recording medium such as magnetic tape, etc., permits a satisfactorily reproduced video signal even at a joint between the recorded video signal and a newly recorded video signal.

This function is especially common in video tape recorders (hereinafter called VTR's) of the type using a magnetic tape as the recording medium as a result of increased requirements for size reduction and picture taking. In the following description, VTR's of this type will be discussed as video signal recording apparatus:

The conventional VTR's perform the above stated splice recording opertion by various methods for synchronization of the existing record and a record being newly recorded, including: (1) a method of adjusting timing for stopping the magnetic tape and for allowing the tape to travel again; and (2) a method of recording after synchronization has been made with the existing recorded signal by rewinding the magnetic tape to some extent; etc. The method (1) above can be carried out with a simple structural arrangement. However, the method would become meaningless if the magnetic tape moves even a slight degree while the tape is in repose. It requires a high degree of mechanical precision. As for the method (2) above, the speed of a capstan drive system which drives the tape must be controlled and then the drive system must be further phase adjusted to the video signal and the control signal recorded on the tape (hereinafter the control signal will be called CTL) during the process of synchronization which is carried out after rewinding of the magnetic tape. The method (2) thus requires a long control time and thus necessitates rewinding the tape to a great extent. In accordance with the method (2), therefore, it is difficult to determine the timing for actually carrying out connected (or splice) recording. Another method has been attempted in which the phase adjustment of the CTL is quickly carried out after the speed of the drive system has been controlled. This method is, however, not desirable because the phase control loop of the apparatus becomes unstable.

In view of the above problems in the prior art, it is an object of the present invention to provide a video signal recording apparatus which permits connected (or splice) recording with only a short period of time required for synchronization. More specifically, the object is to provide a video signal recording apparatus which is capable of quickly carrying out the phase adjustment of the drive system, newly recording a video signal and recording a control signal on the recording medium.

It is another object of the invention to provide a video signal recording apparatus which permits connected or splice recording in a satisfactory manner even when the recording medium is rewound only slightly for that purpose.

SUMMARY OF THE INVENTION

To attain this object, one specific embodiment of the present invention includes: Drive means for driving a recording medium; video signal recording means for recording a video signal on the medium; control signal reproducing means for reproducing a control signal recorded on the medium; signal producing means for producing a first signal which relates to the driven state of the medium; first control means for controlling the drive means according to a phase difference between the control signal reproduced by the control signal reproducing means and a second signal which relates to a video signal to be recorded on the medium; and a second control means for controlling the signal producing means with the second signal during a period close to a time at which at least the drive means reaches a prescribed stable condition.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
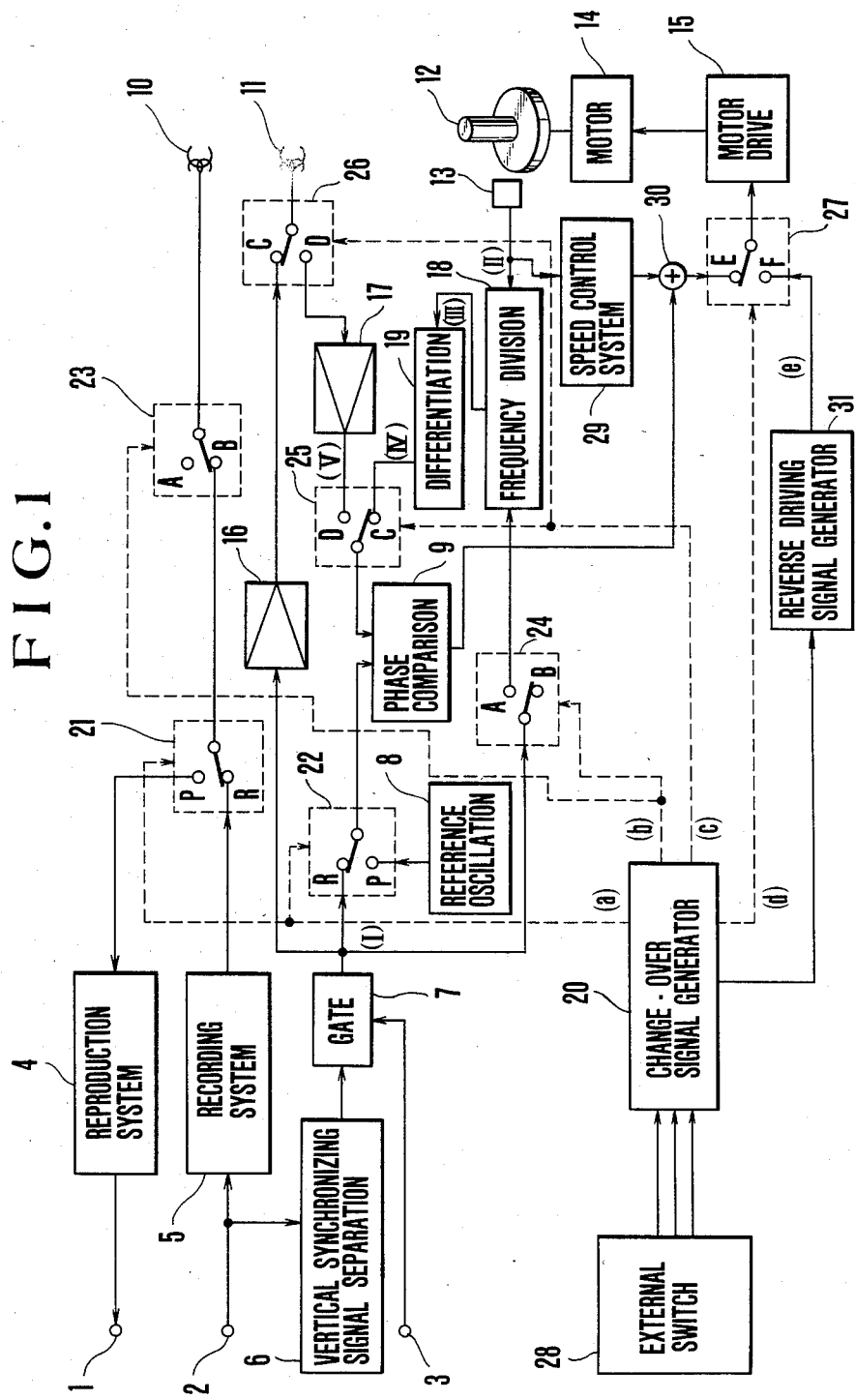
FIG. 1 is a circuit diagram of an embodiment of the invention wherein the invention is applied to a VTR.
Figure 2:
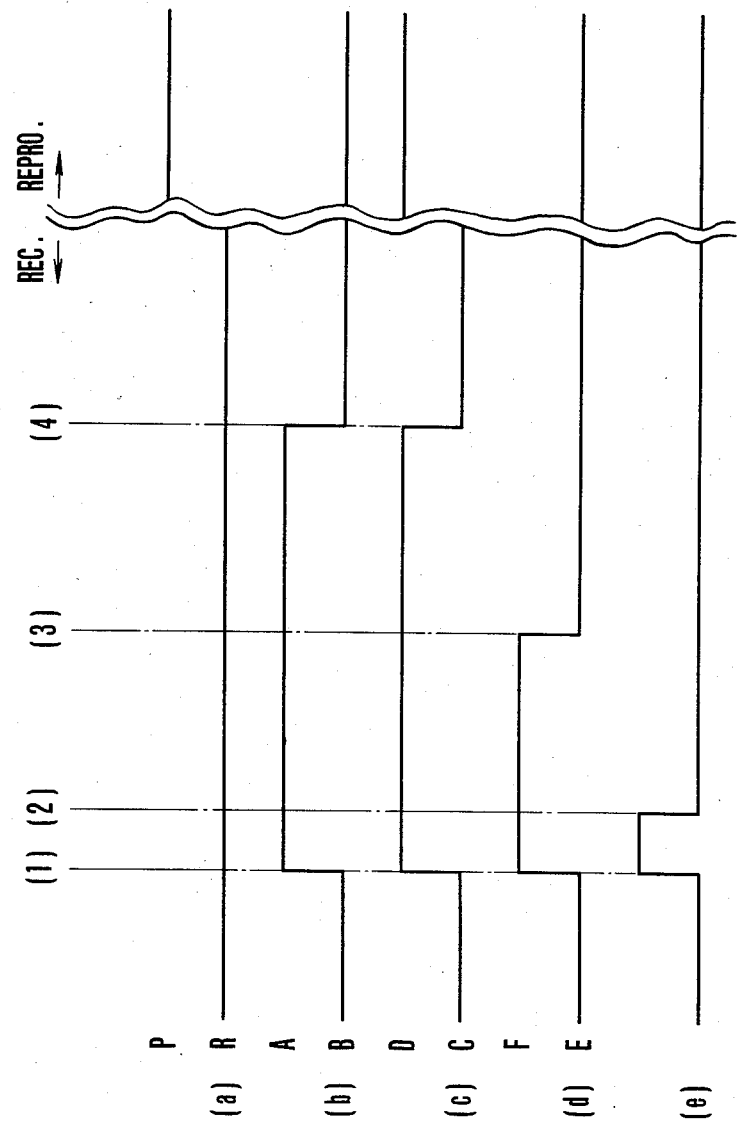
FIGS. 2(a)–(e) and 3 are timing charts showing the wave form of each part of the embodiment shown in FIG. 1.

An embodiment of the invention wherein the invention is applied to a VTR is shown in FIG. 1. This embodiment includes an output terminal 1 for a video signal; an input terminal 2 for a video signal; a gate pulse input terminal 3; a video signal reproducing system circuit 4; a video signal recording system circuit 5; a vertical synchronizing signal separating circuit 6 which extracts a vertical synchronizing signal from the input video signal; a gate circuit 7 which is operated by gate pulses applied to the gate pulse input terminal 3; a reference oscillator 8; a phase comparator 9; a recording/reproducing head 10; a recording/reproducing head 11 for the control signal CTL; a capstan 12; a pulse generator 13 which generates pulses (hereinafter called FG pulses in synchronization with the rotation of the capstan 12; a captan motor 14; a drive circuit 15 for the capstan motor 14; recording and reproducing amplifiers 16 and 17 for the control signal CTL; a frequency divider 18 for the FG pulses generated by the FG pulse generator 13; a differentiation circuit 19; and switches 21–27 which are controlled by a change-over signal generator 20. The wave form of each output of the change-over signal generator 20 is shown in the FIG. 2 timing chart. This embodiment operates as described below with reference to FIG. 2:

Under a normal video signal recording condition, that is, prior to a predetermined time (1) shown in FIG. 2, each of the switches 21–27 are connected to the sides as shown in FIG. 1. The video signal supplied through the input terminal 2 is processed by the recording system circuit 5 and is recorded on the magnetic tape (not shown) by the recording/reproducing head 10. The vertical synchronizing signal of 60 Hz which is separated by the vertical synchronizing signal separating circuit 6 is gated by the gate circuit 7 and is supplied to the phase comparator 9 as a pulse wave of 30 Hz. Meanwhile, the FG pulses, which are in relation to the rotation of the capstan 12, are frequency divided to be of 30Hz by the frequency divider 18. With the FG pulses produced from the generator 13 assumed to be 180 Hz, for example, the frequency divider 18 becomes a 1/6 frequency divider. From the output of the frequency divider 18, only a positive differentiation output is extracted by the differentiation circuit 19 and is applied to the phase comparator 9. An error output of the phase comparator 9 is then supplied to the motor drive circuit 15 together with the output of a speed control circuit 29 to control and drive the capstan motor 14.

At the predetermined time (1) shown in FIG. 2, the positions of the switches 23–27 are respectively inverted when an instruction to temporarily suspend the process of recording the video signal is supplied from an external switch 28 (generally, this is effected by turning a pause switch in the case of a VTR). The video signal recording comes to a stop with the switch 23 first connected to a side A thereof. Then, since the switch 27 is connected to a side F thereof, the motor drive circuit 15 is released from the recording control. The capstan motor 14 is then driven by the output of a reverse driving signal generation circuit 31 as indicated by (e) in FIG. 2. Then, after the lapse of a suitable short predetermined time, the output of the reverse driving signal generation circuit 31 becomes zero at a time (2) shown in FIG. 2. This brings the capstan motor 14 to a stop. The magnetic tape is thus rewound slightly to a suitable extent after the recording suspending instruction and is then left in repose until recording resuming instruction is resumed. Upon receipt of the recording resuming instruction at a time (3) shown in FIG. 2, the switch 27 returns to its position E. The capstan motor 14 then drives the tape to travel. At this time, the phase control over the capstan motor 14 is accomplished with the vertical synchronizing signal included in the video signal supplied to the input terminal 2 and with a reproduced control signal CTL which is obtained by reproducing a recorded control signal CTL. With the recording resuming instruction thus received, recording does not begin only while the tape begins to travel. Then, phase adjustment is accomplished between the reproduced control signal CTL relating to the recorded video signal and a video signal to be recorded.

Figure 3:
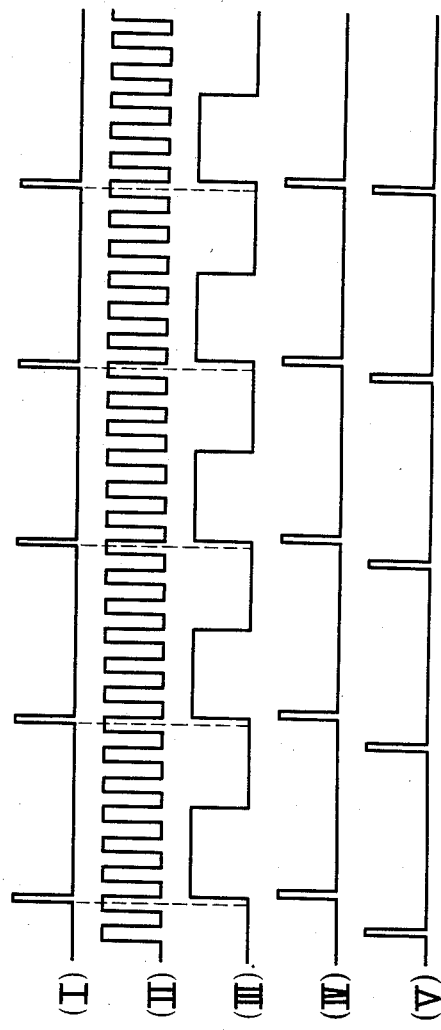

FIG. 3 is a timing chart showing this phase adjustment. The wave forms of the parts I–V shown in FIG. 1 are as shown by parts I–V of FIG. 3. As shown in FIG. 3, the counter of the frequency divider 18 is reset by the rise of the vertical synchronizing signal included in the video signal to be recorded. The output of the frequency divider 18 rises as the FG pulse immediately following it falls. Therefore, during this phase adjustment, a phase difference between the vertical synchronizing signal and the output of the differentiation circuit 19 is thus small.

A predetermined time after the time (3) at which the recording resuming instruction is received, the positions of the switches 23–26 are shifted to begin recording of the video signal. After recording is resumed, phase control over the capstan motor 14 is accomplished with the vertical synchronizing signal of the video signal to be recorded and the FG pulses in the same manner as in ordinary recording mentioned previously. Since the phase difference between the vertical synchronizing signal and the output of the differentiation circuit 19 is small at the predetermined time (4) the phase lock of the phase control system can be very promptly effected after resumption of recording.

A reproducing operation is as follows: When the external switch 28 is shifted to a reproducing mode, the switches 21 and 22 are connected to their sides P, the switches 23 and 24 to their sides B, the switches 25 and 26 to their sides D and the switch 27 to its side E respectively. The video signal, which is reproduced by the recording/reproducing head 10, is produced at the output terminal 1 through the reproducing system circuit 4. The phase control over the capstan 12 is accomplished with the output (30 Hz) of the reference oscillator 8 and a reproduced control signal CTL. Meanwhile, speed control is accomplished by a speed control system 29 which is used for recording.

Figure 4:
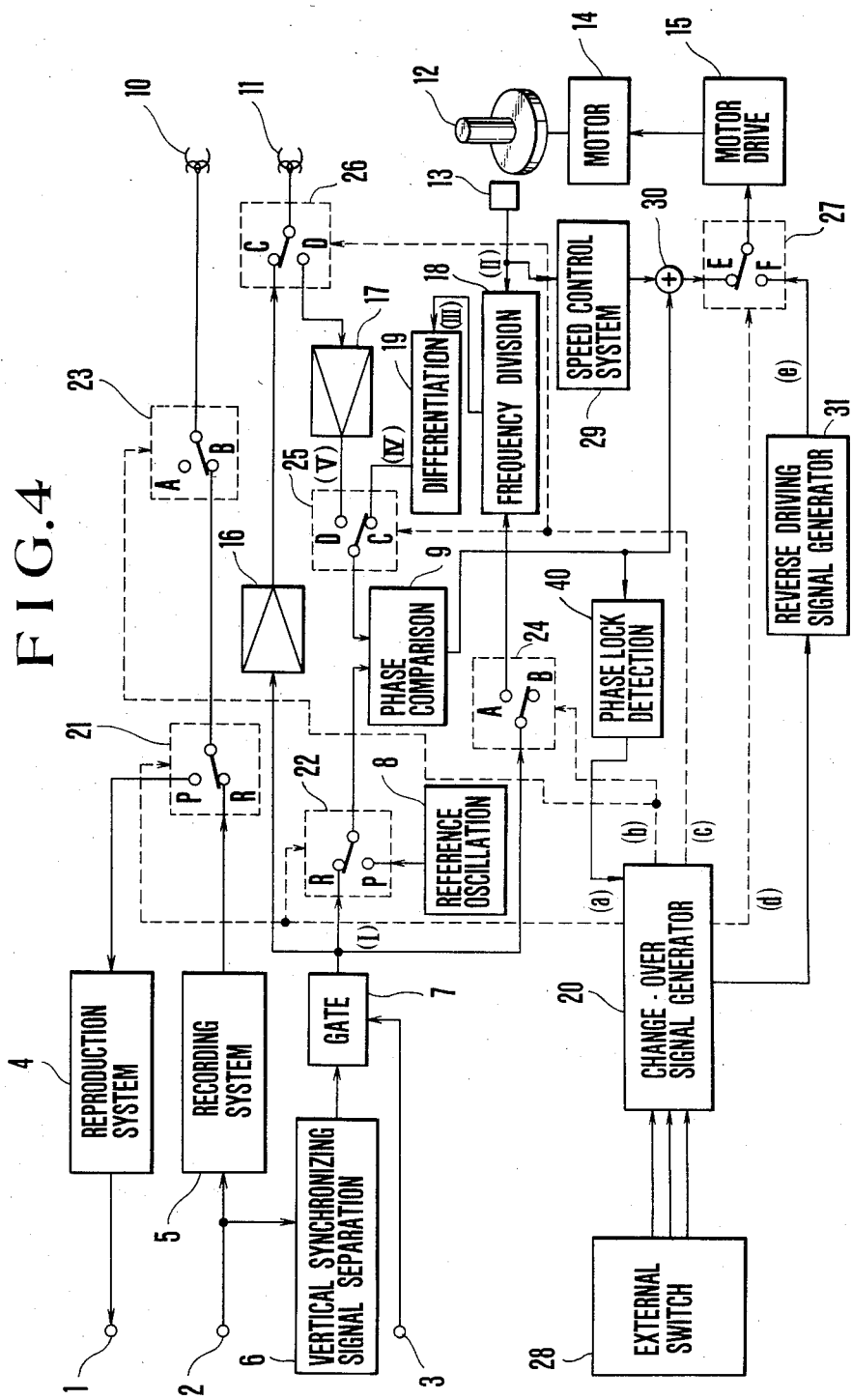
FIG. 4 is a circuit diagram of a VTR in another embodiment of the invention.

FIG. 4 shows a VTR in another embodiment of the invention. In FIG. 4, the same reference numerals are used for indicating the same parts and components as those used in the VTR shown in FIG. 1. These same parts and components will be omitted from the following description. The embodiment includes a phase lock detection circuit 40. When a phase difference between two signals compared at the phase comparator 9 becomes lower than a predetermined value, the phase lock detection circuit 40 supplies a signal to the change-over signal generator 20. The timing of the point of time (4) shown in FIG. 2 is determined by the detection signal obtained at the phase lock detection circuit 40. In other words, the reproduced control signal CTL and the vertical synchronizing signal separated from the video signal to be recorded are phase locked before resumption of video signal recording.

In both the VTR's shown in FIGS. 1 and 4, the vertical synchronizing signal related to the video signal to be recorded and the reproduced CTL are phase locked during a period between resumption of magnetic tape driving and resumption of video signal recording. After recording is resumed, phase lock is promptly effected even as the phase control is accomplished with the vertical synchronizing signal related to the video signal to be recorded and with the FG pulses related to the magnetic tape driving speed, because the phase difference between the output of the differentiation circuit 19 and the vertical synchronizing signal has already become small by the recording resumption time. Therefore, in the arrangements shown in FIGS. 1 and 4, the lenght of time required for phase adjustment between the capstan 12 and the video signal to be recorded, i.e. time before actual resumption of video signal recording after the recording instruction is produced, can be greatly reduced, so that timing for picture taking can be easily determined without missing a desired picture.

With the apparatus shown in FIG. 4, the length of time required for phase adjustment between the reproduced control signal CTL and the newly recorded video signal can be minimized. Accordingly, the extent to which the tape must be rewound can also be minimized.

While in the foregoing description, the magnetic tape is stopped by stopping the motor 14 after it has been rewound, it is also possible to stop the magnetic tape by temporarily disengaging a pinch roller from the capstan 12 and again to bring the pinch roller into contact with the capstan 12 in resuming the driving action.

In the above described embodiment, a predetermined suitable time is the magnetic tape reverse driving period and is the period between resumption of a magnetic tape driving action and resumption of video signal recording; or the period is determined by detecting the phase lock of the reproduced control signal CTL and the vertical synchronizing signal of the video signal to be recorded. However, this method may be replaced with other methods. For example, either the FG pulses or the reproduced control signal CTL is counted during the reverse driving period; with the count number determined beforehand, the extent to which the magnetic tape is to be rewound is determined; and, recording may be resumed after the tape has been allowed to travel the extent of rewinding after drive resumption. This method obliterates the possibility of double video signal recording.

The embodiment uses the vertical synchronizing signal as a signal related to the video signal. However, the vertical synchronizing signal may be replaced with a horizontal synchronizing signal, a signal obtained by frequency dividing the horizontal synchronizing signal or, in the case of a color video signal, a color burst signal or the timing of a signal which is adjusted to the color burst signal.

In the embodiment, a signal obtained from the FG pulses is controlled with the vertical synchronizing signal of the video signal. The period for keeping the phase difference at a small value is from the start of tape rewinding until resumption of actual video signal recording. This control can be accomplished at least either at the time of the resumption of video signal recording or in the vicinity of a time at which motor control reaches a stable condition through the phase comparison between the reproduced control signal CTL and the vertical synchronizing signal.

With regard to a method for controlling the signal obtained from the FG pulses, this control is accomplished in the embodiment by resetting the frequency divider 18. This method, however, can be replaced with other methods. For example, a signal synchronized with a medium driving condition and another signal synchronized with the video signal are phased with each other; and a variable delay means to which the signal synchronized with the medium driving condition may be controlled by an output of the phase comparison.

It is also conceivable to have the counter of the frequency divider 18 reset by the reproduced control signal CTL. However, if recording is resumed before the signal (vertical synchronizing signal) relative to the video signal and the reproduced control signal CTL are not completely phase locked, phase fluctuation takes place after resumption of recording.

The present invention is not limited to VTR's but is applicable also to any apparatus that records video signals on a recording medium together with control signal.

In accordance with the invention, in resuming video signal recording after temporary recording suspension, an already recorded signal and a signal to be recorded are synchronized before recording resumes obtaining a condition which is close to a phase locked condition, so that recording can be carried out satisfactorily in spite of a change that takes place in the method of phase control at the resumption time recording. Accordingly, the length of time required between the receipt of recording resuming instruction and phase lock attainment can be shortened. This invention thus permits satisfactory connected or splice recording in a shortened control time.

What I claim:

1. A video signal recording apparatus, comprising:
   (a) recording means for recording a video signal on a recording medium and forming a video track;
   (b) reproducing means for reproducing a control signal from a control track of the recording medium, the control signal being recorded at positions related to the video tracks;
   (c) moving means for moving the recording medium;
   (d) input means for inputting a video signal;
   (e) separation means for separating a synchronizing signal from the input video signal;
   (f) generation means for generating a timing signal in relation to a moving action of said moving means;
   (g) control means for controlling said moving means, said control means including a selection circuit for selectively outputting the control signal reproduced by the reproducing means and the timing signal generated by the generation means, and a phase comparison circuit for phase comparing the synchronizing signal with the output signal of the selection circuit; and
   (h) setting means for compulsorily setting a phase of the timing signal on the basis of a phase of said synchronizing signal when the selection circuit selects the control signal.

2. An apparatus according to claim 1, further comprising instruction means for instructing the recording of a video signal on the video track based on a manual operation.

3. An apparatus according to claim 2, further comprising changeover control means for changing over operation states of said recording means, reproducing means, selection circuit and setting means in response to said instruction means.

4. An apparatus according to claim 3, wherein said changeover means makes inoperative said reproducing means with the timing of changing over said recording means in to an operative state to cause said selection circuit to select the timing signal and release the operation of said setting means.

5. An apparatus according to claim 3, wherein said changeover means changes over said recording means into an operative state a predetermined time after the manual operation.

6. An apparatus according to claim 3, wherein said changeover means includes a detection circuit for detecting the state of the control signal supplied from said control means to said moving means, and changes over said recording means into an operative state on the basis of an output signal of said recording means after the manual operation.

7. An apparatus according to claim 3, further comprising reverse driving means for moving said recording medium in a direction reverse to the direction in which said recording means is moved by said moving means during operation, wherein said reverse driving means starts to operate on the basis of the manual operation and stops operation before said changeover means changes over said recording means into an operative state.

8. An apparatus according to claim 1, wherein said generation means includes a detection member for detecting the operation of said moving means to produce a detection signal and a frequency dividing circuit for dividing the frequency of said detection signal, and said setting means includes a reset circuit for resetting said frequency dividing circuit by said synchronizing signal.

9. An information signal recording apparatus, comprising:
   (a) recording means for recording an information signal on a recording medium;
   (b) reproducing means for reproducing a control signal from the recording medium, the control signal being recorded at positions related to recording positions of the information signal on the recording medium;
   (c) moving means for moving the recording medium;
   (d) separation means for separating a reference signal from the information signal;
   (e) generation means for generating a timing signal in relation to a moving action of said moving means;
   (f) first control means for controlling said moving means based on a phase error between the reference signal and the timing signal;
   (g) second control means for controlling said moving means based on a phase error between the control signal and the reference signal; and
   (h) setting means for compulsorily setting a phase of the timing signal on the basis of a phase of said reference signal when said second control means is enabled.

10. An apparatus according to claim 9, further comprising interlocking means for interlocking said first control means and said setting means so as to prevent said setting means from operating during the operation of said first control means.

11. An information signal recording apparatus, comprising:
   (a) recording means for recording an information signal on a recording medium;
   (b) moving means for moving the recording medium;
   (c) separation means for separating a reference signal from the information signal;
   (d) generation means for generating a timing signal in relation to a moving action of said moving means;
   (e) control means for controlling said moving means based on a phase error between the reference signal and the timing signal when said recording means records the information signal on the medium; and
   (f) setting means for compulsorily setting a phase of the timing signal on the basis of a phase of said reference signal irrespective of said control means.

12. An apparatus according to claim 11, further comprising interlocking means for interlocking said control means and said setting means so as to prevent said setting means from operating during the operation of said control means.

* * * * *